United States Patent [19]
Emsley et al.
[11] Patent Number: 4,509,635
[45] Date of Patent: Apr. 9, 1985

[54] SORTING SYSTEM

[75] Inventors: Robert M. Emsley, Harpenden; Derek C. Pitt, London, both of England

[73] Assignee: The Post Office, London, England

[21] Appl. No.: 457,518

[22] Filed: Jan. 13, 1983

[30] Foreign Application Priority Data

Jul. 12, 1982 [GB] United Kingdom ................. 8220211

[51] Int. Cl.[3] ........................ B65G 43/10; B65G 47/46
[52] U.S. Cl. .................................... 198/365; 198/706; 198/704; 209/900; 209/698
[58] Field of Search ............... 198/365, 706, 802, 478, 198/370, 704; 209/698, 900

[56] References Cited

U.S. PATENT DOCUMENTS 3,167,192 1/1965 Harrison et al. .................... 414/384
3,269,520 8/1966 Bishop et al. ....................... 198/365
3,463,298 8/1969 Harrison ............................ 198/365
3,669,245 6/1972 Wooten et al. ...................... 198/365
3,974,909 8/1976 Johnson ............................. 198/365
4,004,681 1/1977 Clewett et al. ...................... 198/365
4,089,404 5/1978 Venzke ............................... 198/365
4,375,256 3/1983 Selleri ................................ 198/370

*Primary Examiner*—Joseph E. Valenza
*Assistant Examiner*—Douglas C. Voorhees
*Attorney, Agent, or Firm*—Larson and Taylor

[57] ABSTRACT

A sorting system for generally flat articles includes a number of receptacles (2) mounted on a conveyor (1) each of which is disposed to receive and convey an article to be carried lying with its surface of maximum size perpendicular to the conveyor line of travel and which are each angularly displaceable about an axis extending lengthwise of the conveyor between two positions in which a controllable discharge outlet (9) of the receptacle is positioned on opposite sides respectively of the conveyor.

12 Claims, 12 Drawing Figures

SORTING SYSTEM

This invention relates to distribution or sorting systems for generally flat articles e.g. letters, packets, generally flat parcels and the like and is concerned with the provision of certain improvements in such systems.

Known sorting systems applicable to the distribution of such articles include a number of compartments mounted on a conveyor the path of which passes through at least one loading station and at least one sorting station in which each compartment which receives an individual article is in the form of a pigeon hole which has its surface of maximum size perpendicular to the direction of movement of the compartment and which is provided with an openable base wall for the discharge of the articles into collecting containers at the sorting station.

Such known sorting systems have hitherto suffered from constraints in their design due to the common requirement that the compartments be carried at a level below the driving or guiding mechanism to facilitate emptying the compartments into receptacles beneath. The constraints imposed on the design arise from the obstruction caused by the guiding or driving mechanism which prevents access to the upper side of the compartment for loading purposes.

The various approaches for overcoming this problem have thus far included the use of parallel supporting tracks on either side of the container e.g. (U.S. Pat. No. 2,689,657), loading the container from the side (U.K. Patent Specification No. 1,466,223) and, in principle, carrying the container to one side of the guide on a cantilevered support (U.K. Patent Specification No. 2,047,189A).

The use of parallel supporting guides for the containers makes it difficult to construct circuits which follow a three dimensional path and such systems have been built with guides following paths in one plane only. Both of the other arrangements referred to above facilitate the use of a circuit following a three dimensional path providing adequate clearance is left between the containers to allow them to negotiate curves, particularly with regard to those in the vertical plane which require the greatest clearance. Both of these systems service their sorting selections sequentially and thus require comparatively long path lengths if every container is to have access to all available selections.

The invention is concerned with the provision of an alternative arrangement which provides the means for compacting the size of machine whilst retaining high throughput.

According to the present invention there is provided a sorting system for generally flat articles comprising a conveyor, a plurality of receptacles carried by said conveyor and individually disposed to receive and convey an article to be carried with the surface of maximum size of the article perpendicular to the line of travel of the conveyor, each of the receptacles include a controllable discharge outlet and each of the receptacles being disposed to lie in one or the other of first and second inclined positions in which the receptacle is inclined to the vertical about an axis extending lengthwise of the conveyor and the discharge outlet to the receptacle is positioned on one or the other of the opposite sides of the conveyor, and means for permitting angular displacement of each receptacle about said axis between said inclined positions so that the controllable discharge outlet of the receptacle can be positioned on either one of the opposite sides of the conveyor.

In order that the invention may be more fully understood, one construction of sorting system in accordance with the invention and for postal packets will now be described, by way of example, with reference to the accompanying drawings in which.

Figure 4:
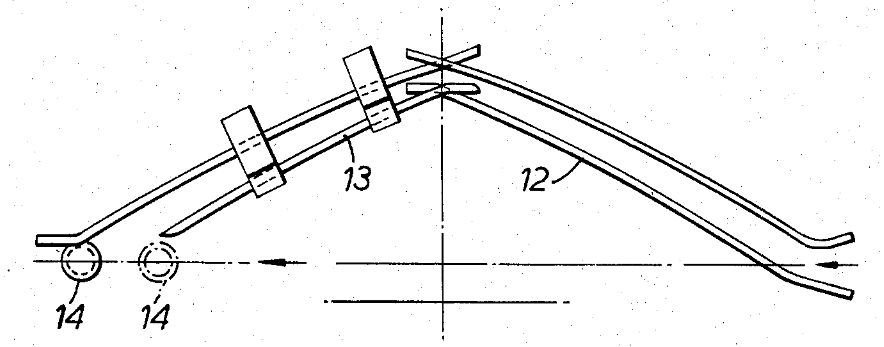
Figure 5:
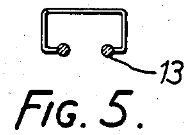
Figure 6:
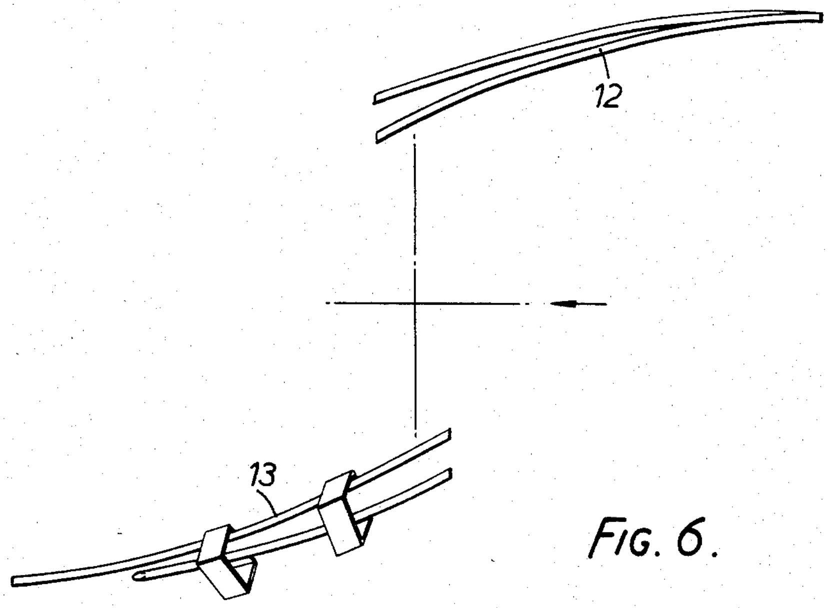
Figure 7:
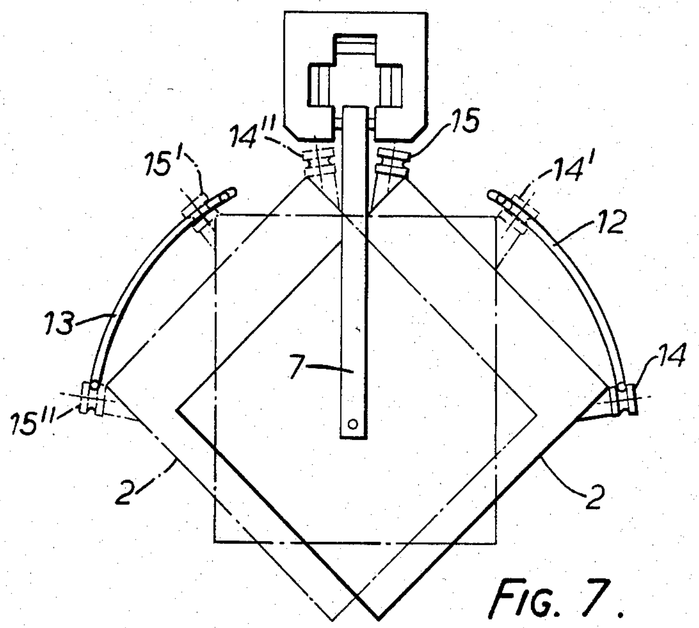
Figure 8:
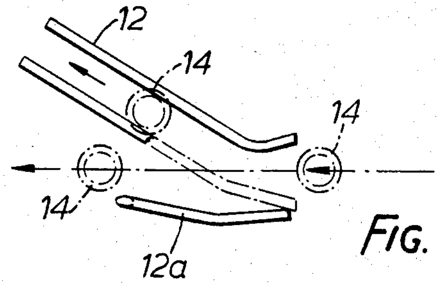
Figure 9:
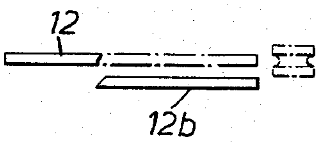
Figure 10:
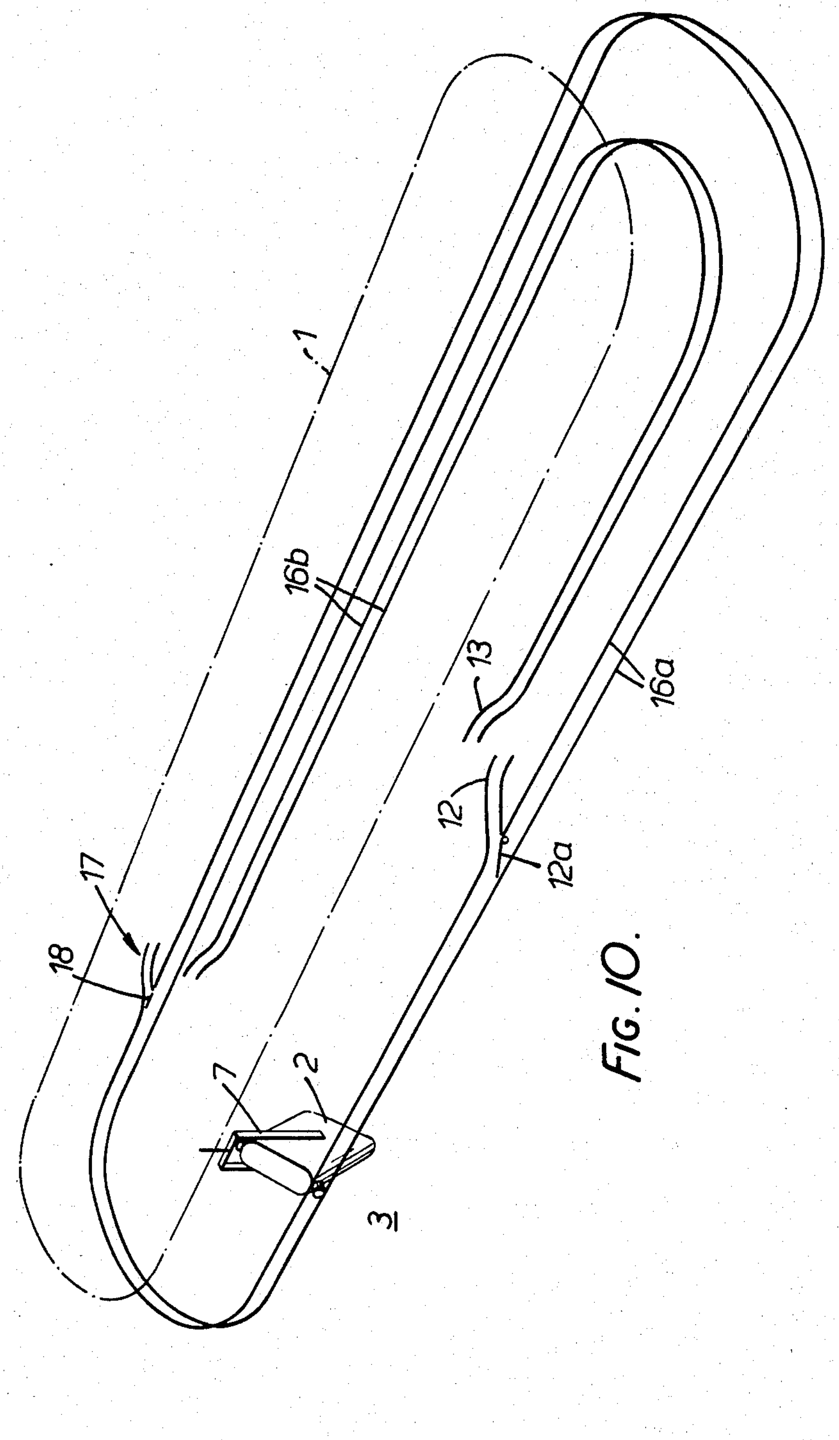
Figure 11:
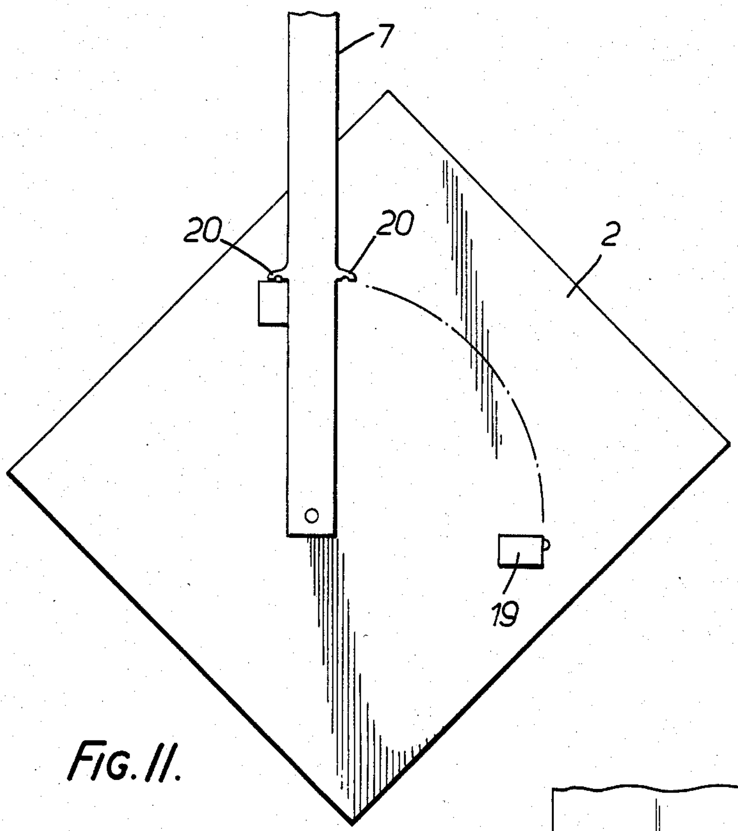
Figure 12:
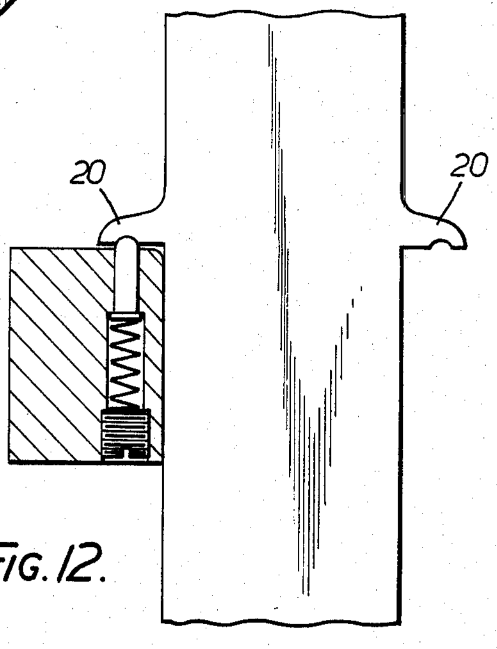

FIG. 4 shows a side view of a scroll ramp arrangement included in the system, FIG. 5 shows a section of the scroll ramp arrangement, FIG. 6 shows a plan of the scroll arrangement, FIG. 7 is a diagrammatic sectional view through the conveyor showing the cooperation between the scroll ramp arrangement and a receptacle, FIG. 8 shows in plan a selector mechanism forming part of the scroll arrangement, FIG. 9 shows an alternative form of selector mechanism also in plan, FIG. 10 shows a guide rail arrangement for the receptacles, FIG. 11 shows an alternative means for positioning the receptacles, and FIG. 12 shows a detail of FIG. 11 to an enlarged scale.

Figure 1:
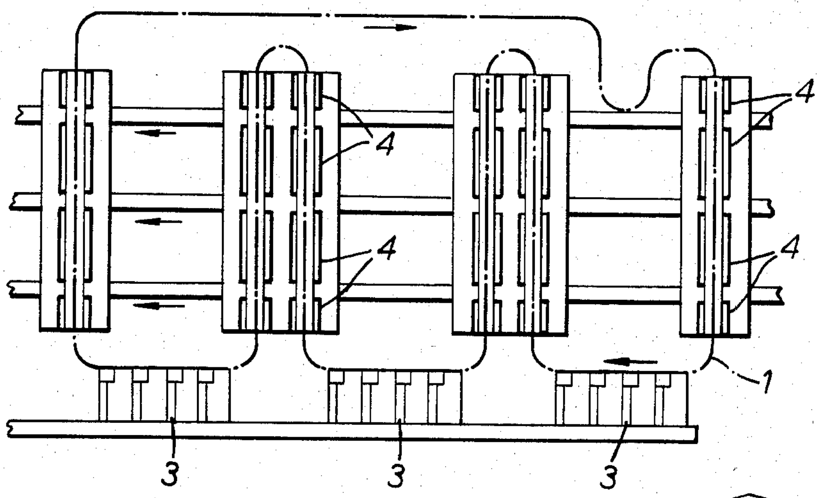
FIG. 1 shows a plan view of the complete system layout.
Figure 3:
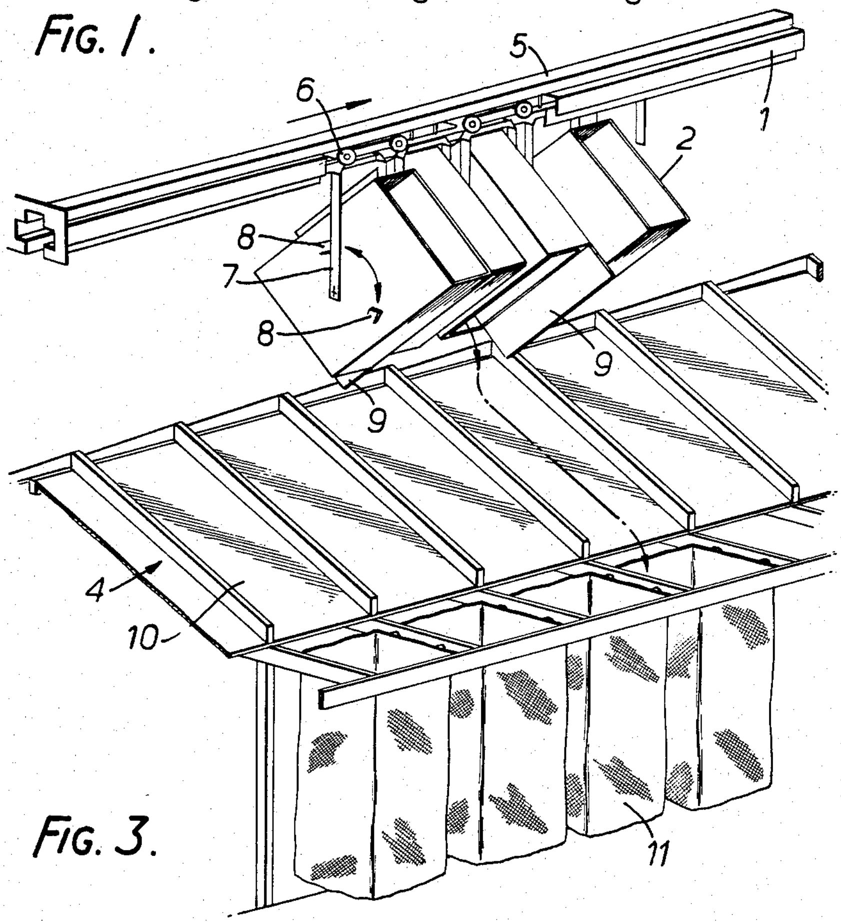
FIG. 3 shows to a larger scale still a perspective side view of a detail of the system, the view showing a portion of the conveyor of the system, suspended receptacles, underlying chutes and mail bags.
Figure 2:
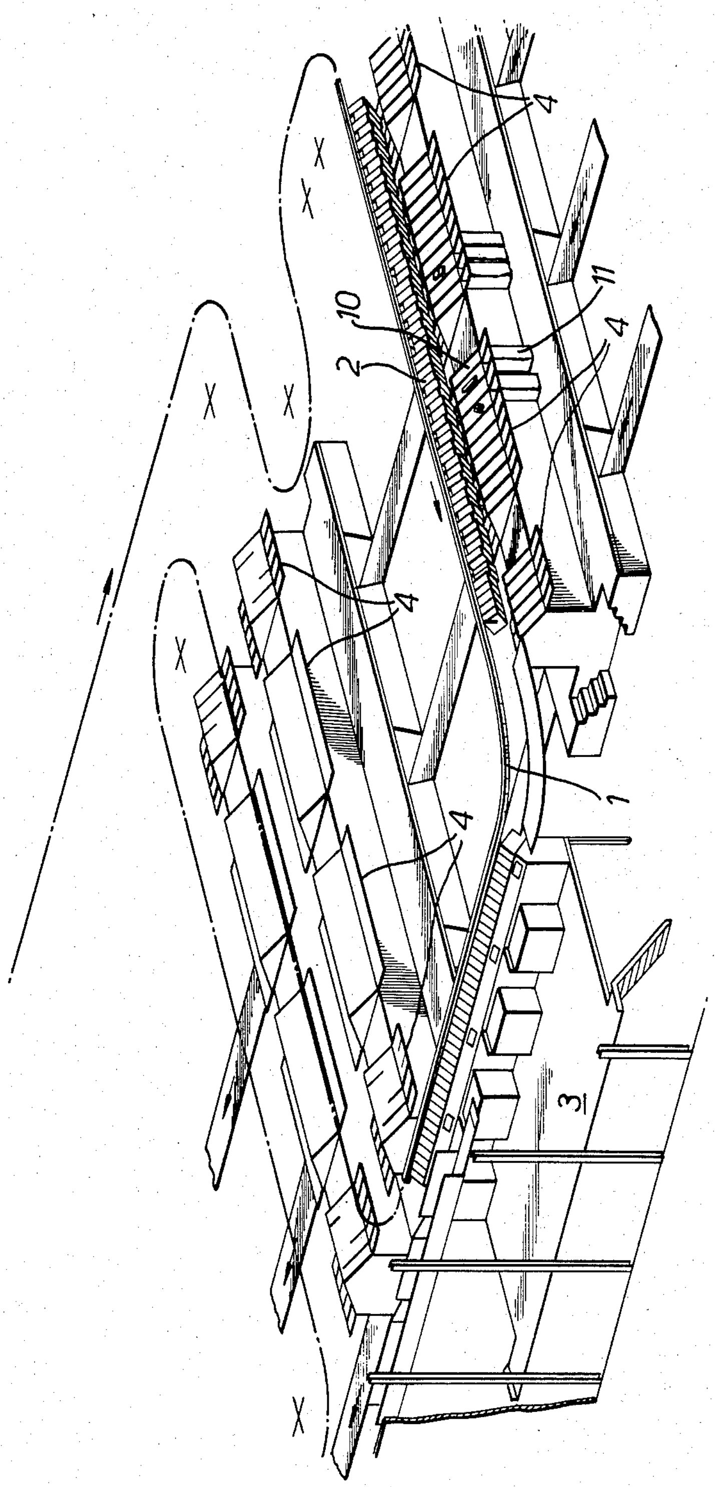
FIG. 2 shows to a larger scale a perspective view of part of the system.

Referring to FIGS. 1 to 3, the system consists of an overhead conveyor 1 from which a number of receptacle bins 2 are suspended to be conveyed between loading points 3 and destination points 4. As seen in FIG. 3, the conveyor consists of an overhead girder 5 housing a roller conveyor chain 6 of conventional type from which depend brackets 7. The brackets are arranged in pairs and the brackets of each pair carry between them a bin 2. As will be seen, each bin is of rectangular slab-like form and is open at its top. Furthermore, the bins are disposed side by side each to receive and convey a packet with the latter lying with its surface of maximum size perpendicular to the conveyor line of travel and are in fact closely spaced with the pitch between them determined by the shortest rather than the longest dimension of the packet to be carried. In the case of packets of minimum dimension of 5 inches (the accepted maximum for this dimension), the pitch of the bins will be about 8 inches.

The bins are pivotally mounted on their respective brackets so as to be angularly displaceable about an axis extending lengthwise of the conveyor between positions determined by stops 8 in which the opening of each bin lies on opposite sides respectively of the conveyor. The pivot axis of each bin is located substantially below the centre of gravity of the bin so that the bin is bistable in the sense that it is biassed into each position with an over-centre action when being rotated from one position to another. At the opposite end to the opening, each bin is provided with a controllable outlet in the form of a hinged bottom discharge flap 9 which is also positioned on opposite sides respectively of the conveyor in the two aforesaid positions of the bin.

Below the bins are discharge chutes 10 leading to mail bags 11.

The purpose of mounting the bins in the manner described is to enable destination points to be provided on both sides of the conveyor notwithstanding that loading of the bins takes place from one side only of the conveyor and to this end means are provided between each loading section, that is each group of loading points 3, and the following destination section, that is the following group of destination points 4, for displacing or tipping selected ones of the bins after they have been loaded from one angular position or orientation to another.

Referring now to FIGS. 4 to 7, each such means comprise a scroll ramp arrangement consisting of two scroll ramps 12 and 13 which are positioned on opposite sides of the conveyor immediately above the bins. Furthermore each bin carries two rollers 14 and 15 to cooperate with the scroll arrangements. The leading scroll 12 incorporates a selector in the form of a pivoted portion 12*a* (FIG. 8) by means of which particular bins may be selected for re-orientation as shown. In operation of the ramp scroll arrangement, as a bin selected for tipping reaches the scroll 12, assuming it is set in the position shown in FIG. 4 and in broken line in FIG. 8, the roller 14 enters the scroll and as the movement of the bin along the conveyor path continues the bin will be pivoted. By the time the roller 14 reaches the position 14' in FIG. 7 the roller 15 will have entered the scroll 13 as shown at 15' to continue the re-orientation of the bin with continued conveyor movement until the rollers reach the positions 14'' and 15''. The rollers 14 and 15 may be of plastics material to ensure quiet operation.

If desired the scroll portion 13*a* may be pivotally mounted at its opposite end to that shown in FIG. 8 and in another alternative indicated in FIG. 9, a part 12*b* of the scroll 12 is rectilinearly displaceable as shown.

Means for returning those bins which have been reorientated to their original orientation are located before each loading section. Such means comprise a similar scroll ramp arrangement but without a selector mechanism. Bins already correctly orientated pass through these fixed ramps without interference.

Conveniently, the rollers 14 and 15 are used to stabilize the bins in their passage through the loading sections and destination sections by means of guide rails with which the rollers cooperate, provided in these sections. If desired the guide rails may be provided throughout the length of the conveyor path except of course where the bins pass through a displacing or returning scroll. This is illustrated in FIG. 10 in which guide rails 16*a* for the undisplaced receptacles and guide rails 16*b* for the displaced receptacles are shown. 17 indicates an above-mentioned return scroll ramp. This may include a sprung blade 18 which without impeding restoration of the receptacles requiring restoration, prevents any tendency of the undisplaced receptacles passing through the ramp to tilt.

To discharge packets from the bins at the destination points, each bin is provided with a delatching mechanism not shown which is mounted on one of the brackets 7 and which when actuated, releases the bottom flap 9 of the bin to allow this to open. The delatching mechanism operates to open the flap 9 irrespective of the orientation of the bin and only requires a single actuator at the particular destination point. The flaps of the bins are closed by a sprung ramp positioned at the end of the particular destination section which simply lifts up the flaps of the emptied bins and latches these shut, this operation taking place after restoration of those bins requiring restoration.

In operation of the system, packets will arrive at each loading point and the operator will encode the address of each packet he handles which may be accomplished in a variety of ways e.g. by means of a keyboard or verbally using a voice recognition system. He then places the packet in one of the bins being the first available bin allotted to him which is greatly facililitated by the low chain speed employed. It should be mentioned at this stage that the conveyor is under the control of a central control system and this arranges the allocation of the empty bins to the individual operators. To inform the operator which bin is available, a system such as a strip of lights may be used and conveniently these would be lit in sequence to track the bin as it moves past the operator. After placing the packet in the appropriate bin, the operator presses a "packet sent" key to assign the previously encloded address to that bin. A synchronised automatic injection system could be used as an alternative to manual input.

On leaving the particular induction or loading section, certain of the bins will require rotation and this is achieved by means of the scroll ramp arrangement 12, 13 located immediately prior to the destination section containing the assigned destination. The scroll ramp arrangements are under the control of the central control system. The bins are thus pre-set to either left or right before they reach their discharge points. On reaching their destination the delatching mechanism of each bin is operated by the actuator at the particular destination point to discharge the packet.

Prior to reaching the next loading section the bins which require rotation to the correct position for loading are rotated by the fixed scroll positioned immediately upstream of the particular loading section and after such reorientation the flaps of the bins are closed by the sprung ramp.

If desired, a number of the more heavily used destinations may be repeated in the various destination sections.

As an alternative to pivotally mounting the bins so that they have a bistable action, the bins may be differently pivoted (FIGS. 11 and 12) and a spring detent 19 or other positive retaining system employed to hold the bins in the aforesaid positions on opposite sides of the conveyor. The detents 19 cooperate with lugs 20 on the brackets 7.

The above described sorting system provides both naturally easy loading and the means for compacting the size of machine whilst retaining high throughput and the maximum sorting breakdown available to each container. Typically a throughput of 8–10,000 packets per hour may be achieved with a chain speed of 0.5 m/s. In particular the system reduces the required circuit length of the machine by providing the means for sorting directly from each container to one of two alternate selections at each sorting outlet.

Subject to similar constraints as those applying to the already known machines, the above machine is fully capable of following a three dimensional path but for smallest size and high throughput it is best suited for use in the horizontal plane only.

Furthermore whilst a conveyor having a path of varying configuration has been shown, the conveyor may equally have a path of uniform configuration e.g. of rounded oblong shape.

We claim:

1. A sorting system for generally flat articles comprising a conveyor, a plurality of receptacles carried by said conveyor and individually disposed to receive and convey an article to be carried with the surface of maximum size of the article perpendicular to the line of travel of the conveyor, each of the receptacles including a controllable discharge outlet and each of said receptacles being disposed to lie in one or the other of first and second inclined positions in which the receptacle is inclined to the vertical about an axis extending lengthwise of the conveyor and the discharge outlet of the receptacle is positioned on one or the other of the opposite sides of the conveyor, and means for permitting angular displacement of each receptacle about said axis between said inclined positions so that the controllable discharge outlet of the receptacle can be positioned on either one of the opposite sides of the conveyor.

2. A system as set forth in claim 1, in which each receptacle is biassed into each said inclined position.

3. A system as set forth in claim 1, in which each receptacle is provided with retaining means for releasably holding the receptacle in each said inclined position.

4. A system as set forth in claim 3, in which the retaining means comprise spring detent means.

5. A system as set forth in claim 2, in which the conveyor has a loading station and a number of destination points on both sides of the conveyor and includes displacement means between the loading station and the destination points for displacing selected ones of the receptacles from one said inclined position to the other.

6. A system as set forth in claim 5, in which the displacement means comprise a selective scroll ramp arrangement and elements on the receptacles for cooperating with the scroll ramp arrangement.

7. A system as set forth in claim 5, in which means are also provided for returning the receptacles that have been displaced, to their original position after the receptacles have left the destination points and before they return to the loading station.

8. A system as set forth in claim 6, in which the receptacle returning means comprise a further scroll ramp arrangement.

9. A system as set forth in claim 6 in which guide rail means are provided to cooperate with said elements so as to stabilize the receptacles over at least a part of the conveyor path except during passage of the receptacles through said displacement and returning means.

10. A system as set forth in claim 1, in which each destination point is provided with means for effecting opening of the outlets of selected receptacles.

11. A system as set forth in claim 10, in which each receptacle is mounted on the conveyor by means of a bracket which also carries a mechanism for opening the outlet of the receptacle, the mechanism being operable by an actuator at each destination point.

12. A system as set forth in claim 1, in which the receptacles are each of rectangular slab-like shape.

* * * * *